US008069532B2

(12) United States Patent
Free (10) Patent No.: US 8,069,532 B2
(45) Date of Patent: Dec. 6, 2011

(54) REINFORCED GROMMET FOR CURED IN PLACE LINER

(75) Inventor: Charles W. Free, Hernando, MS (US)

(73) Assignee: INA Acquisition Corp., Wilmington, DE (US)

( * ) Notice: Subject to any disclaimer, the term of this patent is extended or adjusted under 35 U.S.C. 154(b) by 580 days.

(21) Appl. No.: 12/112,446

(22) Filed: Apr. 30, 2008

(65) Prior Publication Data

US 2008/0265527 A1    Oct. 30, 2008

Related U.S. Application Data

(60) Provisional application No. 60/926,953, filed on Apr. 30, 2007.

(51) Int. Cl.
*F16L 5/00* (2006.01)
(52) U.S. Cl. .......................................................... 16/2.1
(58) Field of Classification Search ...................... 16/2.1; 277/641, 637; 285/213; D08/356; 138/98; 405/150.1; 411/533
See application file for complete search history.

(56) References Cited

U.S. PATENT DOCUMENTS

| | | | |
|---|---|---|---|
| 4,776,370 A | 10/1988 | Long, Jr. | |
| 5,263,794 A | 11/1993 | Webb | |
| 5,403,120 A | 4/1995 | Stekette, Jr. | |
| 5,919,327 A | 7/1999 | Smith | |
| 6,103,046 A | 8/2000 | Smith | |
| 6,732,763 B2 * | 5/2004 | Williamson et al. | ............ 138/98 |
| 7,155,953 B1 | 1/2007 | Nikkel | |
| 2002/0100606 A1 | 8/2002 | Rule | |
| 2008/0116319 A1 | 5/2008 | Negley | |

FOREIGN PATENT DOCUMENTS

| | | |
|---|---|---|
| DE | 20021737 U1 | 6/2001 |
| WO | W09311907 A | 6/1993 |
| WO | W09702451 A | 1/1997 |

OTHER PUBLICATIONS

PCT/ISA/210, International Search Report, Sep. 23, 2008, 4 pages.

* cited by examiner

*Primary Examiner* — William L. Miller
(74) *Attorney, Agent, or Firm* — Senniger Powers LLP (57) ABSTRACT

Method and apparatus for forming a grommet assembly to seal and reinforce holes through a cured in place liner for securing a cable. A first grommet base having a centrally located aperture with wedge shaped grooves is positioned on one side of the hole. A barrel having two opposed sets of wedge shaped projections is inserted into the grommet base and a second grommet base is placed on the barrel and pushed towards the liner until the second base firmly contacts the top surface of the liner and compresses the liner against the first base. The wedge shaped projections on the barrel and the complimentary grooves in the central apertures of the grommet bases prevent the barrel from being pulled out of either grommet base. The end of the barrel which projects out above the second base is cut off flush with the top surface. A hydraulic press to install the grommet assembly is also disclosed.

20 Claims, 8 Drawing Sheets

REINFORCED GROMMET FOR CURED IN PLACE LINER

CROSS-REFERENCE TO RELATED APPLICATIONS

This application is based on and claims the benefit of provisional application Ser. No. 60/926,953 filed on Apr. 30, 2007, the contents of which is incorporated herein by reference in its entirety.

BACKGROUND OF THE INVENTION

1. Field of the Invention

The invention relates generally to a grommet for a cured in place liner and, more particularly, to a reinforced grommet, method of manufacture and apparatus for its assembly in a liner for installation purposes.

2. Description of the Prior Art

It is generally well known that conduits or pipelines, particularly underground pipes, such as sanitary sewer pipes, storm sewer pipes, water lines and gas lines, that are employed for conducting fluids require repair due to fluid leakage. The leakage may be inward, from the environment into the interior or conducting part of the pipe, or outward, from the conducting part of the pipe into the surrounding environment. Leakage of this type may be due to improper initial installation of the pipe, deterioration of the pipe itself due to normal aging and/or to the effects of conveying corrosive or abrasive materials, cracking of the pipe or of pipe joints due to environmental conditions such as the movement of large vehicles, natural or man made vibrations, or any other such causes. Regardless of the cause, such leakage can result in leakage fluid being conveyed by the pipe, in damage to the surrounding environment and in the possible creation of a dangerous public health hazard.

Because of ever increasing labor and machinery costs, it is becoming increasingly more difficult and less economical to dig up and replace underground pipes, or portions or sections of such underground pipes, that may be leaking. As a result, various methods have been devised for in situ repair or rehabilitation of existing pipes to avoid the expense and hazard associated with digging up and replacing buried pipes or pipe sections. One of the more successful pipe repair or rehabilitation processes that is currently used is identified as the Insituform® Process and is described in U.S. Pat. Nos. 4,009,063; 4,064,211; and 4,135,958, the contents of all of which are incorporated herein in their entirety by reference.

Briefly, in the Insituform Process, an elongated flexible tubular liner of a felt fabric, or foam or similar resin impregnable material that can be impregnated with a thermosetting synthetic catalyzed resin before installation, is installed within an existing pipe. The impregnated liner may then be pulled into the conduit by a rope or cable, and a fluid impermeable inflation bladder or tube is then everted within the liner. Generally, however, the liner is installed utilizing an inverting (or everting) process, as described in the latter two patents.

Normally, the flexible tubular liners have a smooth layer of relatively flexible, substantially impermeable material coating the outside of the liner in its initial state, which impermeable layer ends up on the inside of the liner after the liner is inverted. As the flexible liner, which is impregnated with a resin, is being installed in place within the pipe, the liner is pressurized from within, preferably utilizing a fluid such as water or air, to urge the liner to advance through the pipe and, thereafter, to force the liner radially outwardly to engage and conform to the interior surface of the pipe. The resin is then cured using steam or the like to form a relatively hard, tight fitting, rigid pipe lining that effectively seals any cracks and that repairs any pipe or pipe joint deterioration to prevent further leakage either into or out of the pipe. The cured resin liner also serves to strengthen the existing pipe walls so as to provide added structural support for the surrounding overburden.

Existing liner insertion methods, especially for the installation of a liner into a large diameter pipe, require positive control of the insertion and inversion of the liner throughout the entire inversion process. The known methods for providing the pressure necessary to invert the liner within the pipe and to push it along the length of the pipe must also involve means for controlling the feed rate of the liner, i.e., the rate at which the liner is inverted and pushed into the pipe. Generally, in the Insituform Process, a resin-impregnated liner of a predetermined length and which is typically stored in folded layers, is placed at a manhole adjacent the conduit to be lined, and the leading end of the liner is sealingly clamped to the proximal inside end of an eversion tube in order to create a fluid seal. Pressurized fluid, such as water, air or the like then forces the liner to invert into the conduit. Various means have been provided for controlling the rate at which the liner inverts and is fed along the conduit. The typical means within the Insituform® Process for controlling the "feed rate" of the liner is by restraining the trailing end of the not cured resin-impregnated liner as it is everted into the conduit using a hold-back cable or rope. By restraining the trailing end of the inverting liner, the liner does not invert too quickly, thereby ensuring that the pressure is maintained within the liner.

In addition to being restrained, the trailing end of the liner must also be sealed so that, when the tube is fully everted, the pressurized water, steam or other fluid within the pipe is contained. At times, these pressures can be large. For example, the hold-back force needed during eversion of a 60-inch diameter liner tube with a 30-foot head of water is in excess of 20,000 pounds. When the tube is fully everted, the end of the liner must resist double that force.

Various means have been proposed to secure a hold-back rope or cable to the trailing end of the liner for restraining the trailing end of the liner and for distributing the pulling stress over the entire width of the end of the liner. It has been proposed to seal the liner at the point of attachment of the hold-back cable in order to prevent the fluid within the liner from escaping through the trailing end and penetrating into the resin-wet material of the liner. One such cable end seal is shown in U.S. Pat. No. 4,776,370, the contents of which are incorporated herein in its entirety by reference.

In the process described in U.S. Pat. No. 4,776,370, a short length of cured synthetic resin film, such as "Tuftane", is bonded directly to the outside of the flattened trailing end of the liner to seal the end of the liner. A series of holes is then formed through the flattened end of the liner. Special plates or straps also having holes are spaced out along both sides of the flattened end of the liner such that those holes align with the holes through the liner. Fastening elements such as nuts and bolts are placed through the holes of both the plates and the liner in order to secure the plates to the liner and seal the end of the liner. The hold-back cable is then attached, either directly or with an additional connector, to the plates for regulating the feed rate of the liner.

Figure 1:
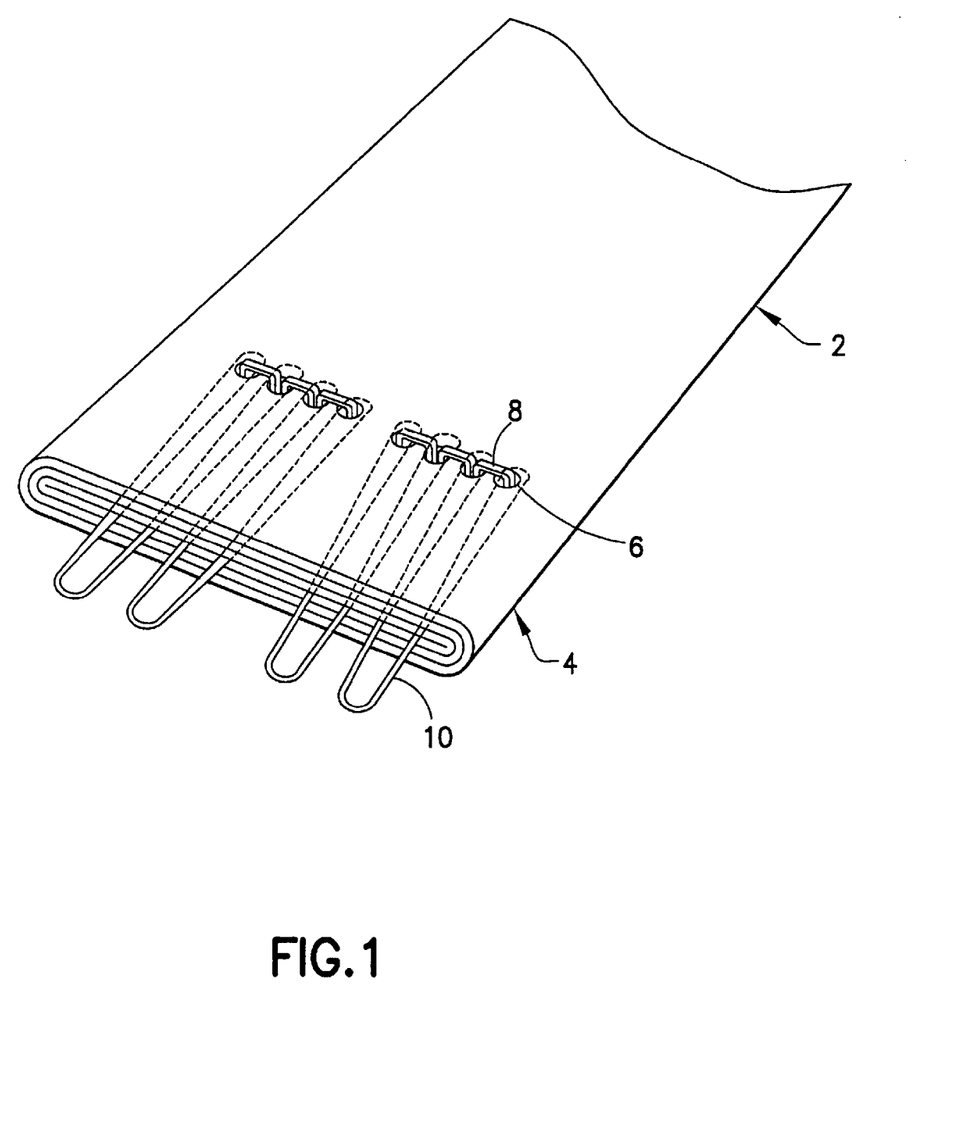
FIG. 1 is a perspective view of a prior art method for securing a hold-back or restraining cable to an end of a cured-in-place liner.

Another prior art way of securing a cable or rope to the trailing end of the liner for sealing the end of the liner and for distributing the pulling stress over the entire width of the flattened liner end is to use a series of holes as shown in FIG. 1. In this method a liner 2 having a trailing end 4 is flattened, and a series of holes 6 is formed through liner 2. Metal grommets may optionally be placed in holes 6 as reinforcement. A cable or rope 8 is then woven through holes 6 across liner end 4, and a number of rope handles 10 are looped around cable 8 at the region where cable 8 passes through liner end 4. Handles 10 are then tied to a hold-back cable for restraining trailing end 4 of liner 2 and for controlling the rate of eversion. In both of these conventional methods, the points at which the holes are formed through the liner and at which the handles emerge from the end of the liner must all be sealed in order to prevent water or fluid leakage. The assembly of such sealed ends is time consuming, difficult and expensive, and the seals are rarely totally effective.

Figure 2:
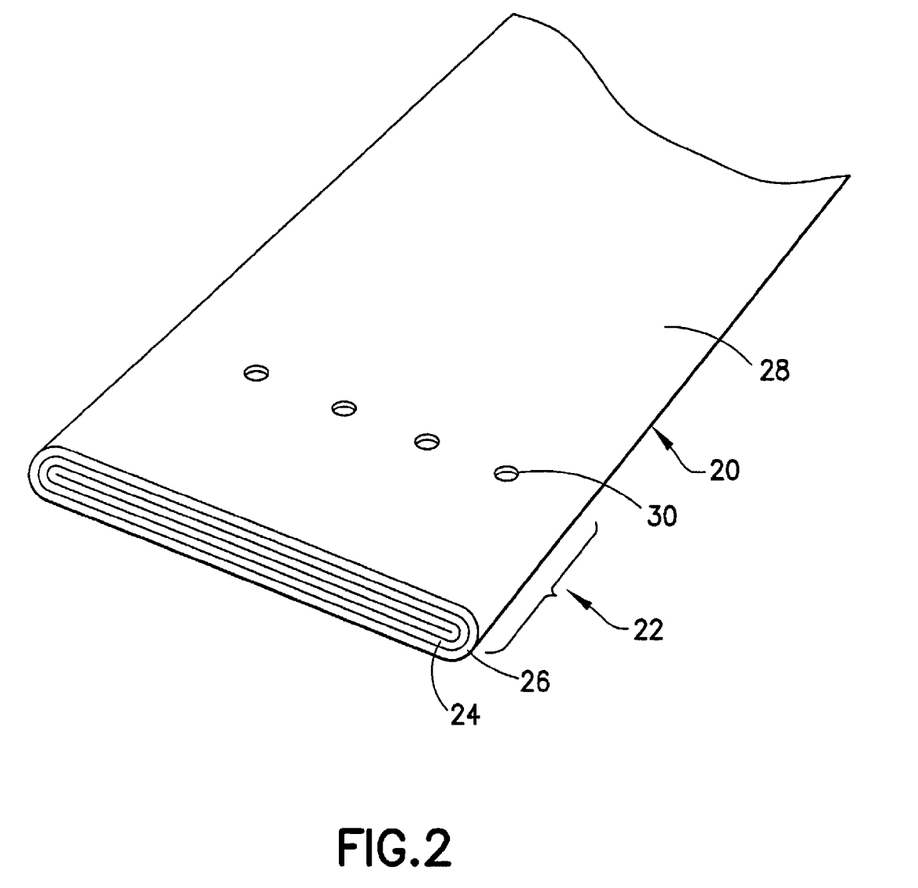
FIG. 2 is a perspective view of the end of a flattened resin impregnable liner with several apertures formed in accordance with the invention.

In still another prior art way of securing a cable or rope to the trailing end of the liner for sealing the end of the liner and for distributing the pulling stress over the entire width of the flattened liner end is shown in FIG. 2. In this method, which is described in U.S. Pat. No. 5,919,327, the contents of which are incorporated herein in its entirety by reference. Initially holes are cut through the liner, and then resin is impregnated into the region about each hole and hardened to form an integral grommet or reinforcement about the hole. A mold for impregnating the region about the hole with resin includes a lower mold body with a projecting spigot and a groove thereabout. The mold also includes an upper mold body having a central opening with a groove thereabout, where the upper mold body fits over the spigot but leaves room to engage a tube therebetween. A tube fits into the central opening for receiving a resin within it. The resin is forced by a plunger down the tube, about the spigot and into the region surrounding the hole in the liner. After injection, the resin is allowed to harden, thus forming a reinforced hole for attaching a pull-in or hold-back rope or cable. Thereafter, the liner can be folded at the end, and reinforcing disks can be placed on the outside of the folded liner in order to distribute the pulling forces along the material. Also, a capstan can be attached to the integrally-formed grommets between the two folded sides of the liner end portion in order to allow the hold-back cable to be wrapped around it so that, when one end of the cable is fixed, the other end of the cable can be slackened to allow the liner to evert slowly within a conduit.

It remains desirable to provide a grommet for a cured in place liner that is more economical to use and requires fewer parts to form attachment points or reinforced holes for a hold-back or pull-in rope or cable.

SUMMARY OF THE INVENTION

A reinforced grommet for a flexible resin impregnable tubular liner for securing a cable thereto is provided. The grommet includes two grommet base members having an outer end surface and an inner liner facing end surface and a centrally located aperture lined with a plurality of circular bands of wedge shaped grooves from the outer end surface to the inner end surface. Starting from the outer end, the grooves have an inclined edge that is inclined away from the axis of the aperture. The second edge forming the groove is perpendicular to the axis of the barrel. A barrel with complimentary wedge shaped projections is securely engaged in each grommet base placed on opposite sides of a hole formed in a flattened section of cured in place liner. The grommet assembly allows for securing a rope or cable for hold-back during inversion or for pulling-in of a liner.

The barrel has a two set of wedge shaped projections with opposed inclined edges. A first set has an inclined edge starting at one end on the barrel and inclining away from the central axis of the barrel. The second edge of the projection is perpendicular to the axis of the barrel. This first set of projections extends for a length about the depth of the grommet base. A second series of wedge shaped projections with an edge also inclined from the other end of the barrel away from the central axis of the barrel extend along the remainder of the length of the barrel. The barrel end with the first set of projections is inserted into one grommet base and the barrel is then inserted through the hole in the liner. A second grommet base is inserted over the barrel and pushed down to press against the liner with the complimentary rings of projections on the barrel sliding past each groove on the grommet base that firmly engages the barrel. The wedge shaped grooves in the central apertures of the top and bottom grommet bases engage the wedge shaped projections on the barrel to prevent the barrel from being pulled out of either grommet base. The end of the barrel which projects out above the grommet base is cut off flush with the top surface of the grommet base. The wedge shaped barrel projections engage the complimentary wedge shaped grooves in the central grooves in the grommet base members allow the barrel to be pushed into the central apertures, but strongly resist the barrel being pulled out of either grommet base.

A grommet press for applying the significant pressure required for installing the grommet assembly on a cured in place liner is also provided. The press includes a hydraulic cylinder with a center shaft with least one groove at the end mounted on a frame having a hollow cavity a compression plate at the entrance to the cavity. A pre-assembled barrel and one grommet base is fed through the hole in a liner and positioned on a notched compression plate positioned in the groove on the center shaft. A second grommet base is placed at the exposed end of the barrel and hydraulic pressure is supplied to the hydraulic cylinder for drawing the center shaft into the hollow cavity. This draws the barrel into the hollow cylinder and pushes the grommet base along the barrel and compresses the liner between the grommet bases. This also seals the region around the hole in the liner thereby preventing resin from escaping from the liner during handling and installation.

Accordingly, it is an object of the invention to provide an improved method for securing a hold-back or pull-in rope or cable to a flexible resin impregnable tubular pipe liner that is to be installed within an existing conduit.

It is another object of the invention to provide apparatus that can be more quickly implemented and is more economical to use to reinforce an aperture in a resin impregnable liner.

It is a further object of the invention to provide an improved seal for the end of a flexible resin impregnable liner that is to be installed within an existing conduit.

It is yet another object of the invention to provide an improved reinforced aperture at an end of a flexible resin impregnable liner that is to be installed in an existing conduit.

It is yet a further object of the invention to provide apparatus for forming a new improved member about an aperture in a flexible resin impregnable tubular liner.

It is still another object of the invention to provide a method for providing a reinforcing member about an aperture in a flexible resin impregnable liner.

Still other objects and advantages of the invention will in part be obvious and will in part be apparent from the specification.

The invention accordingly comprises the several steps and the relation of one or more of such steps with respect to the others, and the apparatuses possessing the features, properties and relation of elements which are exemplified in the detailed disclosure and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Referring to FIG. 2, a cured in place liner 20 having an end 22 formed from several layers of felt 24 in lay flat condition is shown. Liner 20 has an outer flexible resin impermeable coating 28. One or more holes 30 are cut, punched or drilled through all the layers of felt 24 and coating 28 with a suitable hole saw or punch. The number of openings 30 formed depends upon the diameter of liner 20. For a liner with a diameter of ten inches or less, one aperture may be sufficient. For a liner with a large diameter, i.e., 60 inches or more, there may be a need for six or more openings.

Figure 3:
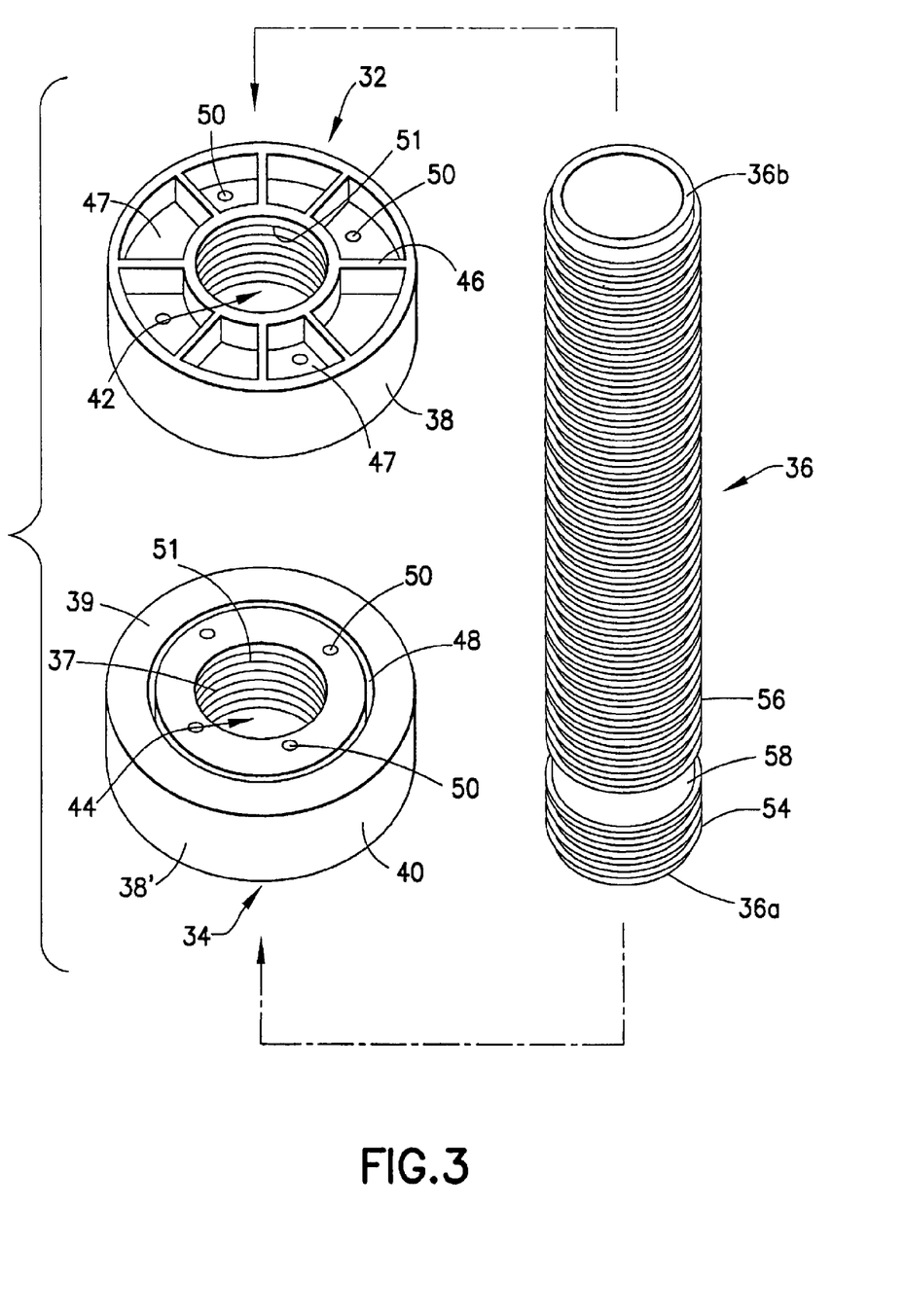
FIG. 3 is an exploded perspective view of a top member, a base member and a hollow barrel for forming a reinforced aperture at an end of a cured in place liner in accordance with the invention.

FIG. 3 is an exploded perspective view of the elements of a grommet assembly 40 constructed and arranged in accordance with the invention. A first grommet base 32 placed on one side of liner 20 and a second grommet base 34 placed at the bottom of liner 20 are identical in construction. Grommet bases 32, 34 are shown separately to illustrate all the elements thereof. Both are formed with a cylindrical side wall 38, 38' having an outer end surface 33 and an inner liner facing end surface 39 and a central opening 42, 44. Outer surface 33 is formed with a plurality of radial ribs 46 forming pie shaped depressions 47. A number of fastener opening 50 are formed in the base of depressions 47. Central opening 42, 44 are formed with a plurality of rings of circular wedges having inclined surfaces inclined towards outer surface 33 as described in more detail below. Inner surface 39 of base numbers 32, 34 is substantially flat and has a circular groove 48 having a depth of about 0.125 inches for receiving an O-ring 49. In the illustrated embodiment a separate O-ring 49 is utilized. Alternatively, an integrally molded O-ring 49 can be formed.

Figure 7:
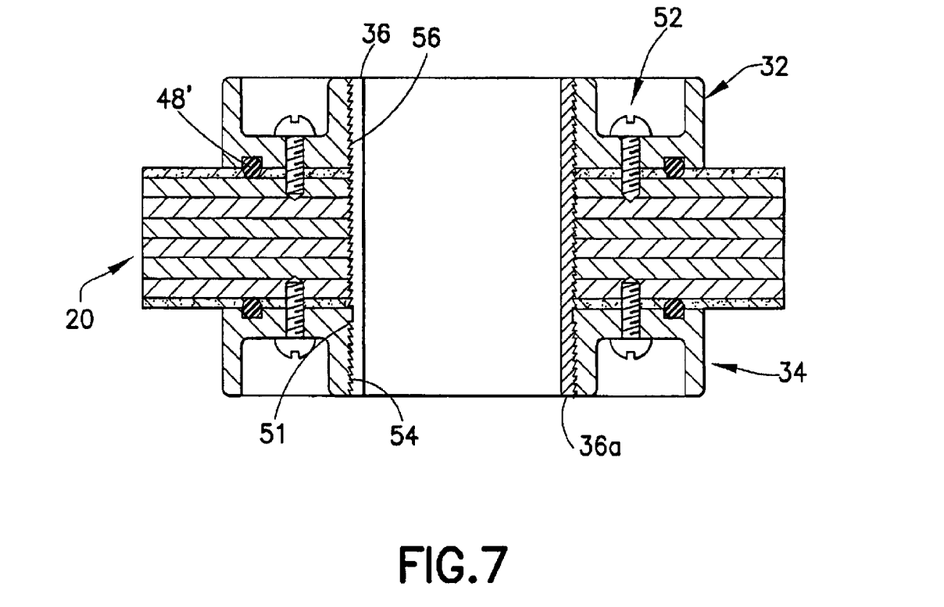
FIG. 7 is a sectional view showing radially projecting wedge shaped teeth of the top and base members in engagement with radially projecting wedge shaped teeth on the barrel, attached to a cured in place liner.

Both types of O-rings provide pressure against outer impermeable coating 28 of liner 20 and assist in securing grommet base members 32, 34 in place during use. Four openings 50 located in the flat portions of base members 32, 34 are provided as clearance openings for threaded fasteners such as sheet metal screws 52 as shown in FIG. 7 which may have a length of about one-quarter to three quarters of an inch. The length of the threaded fasteners, if used, is dependent on the uncompressed thickness of the sleeve to which top and bottom grommet members 32, 34 are attached. Alternatively, a number of spikes 52' can be molded into inner liner facing surface 39 as shown in grommet base 32', 34' FIG. 4A that also shows an integrally molded O-ring 49'.

Figure 4:
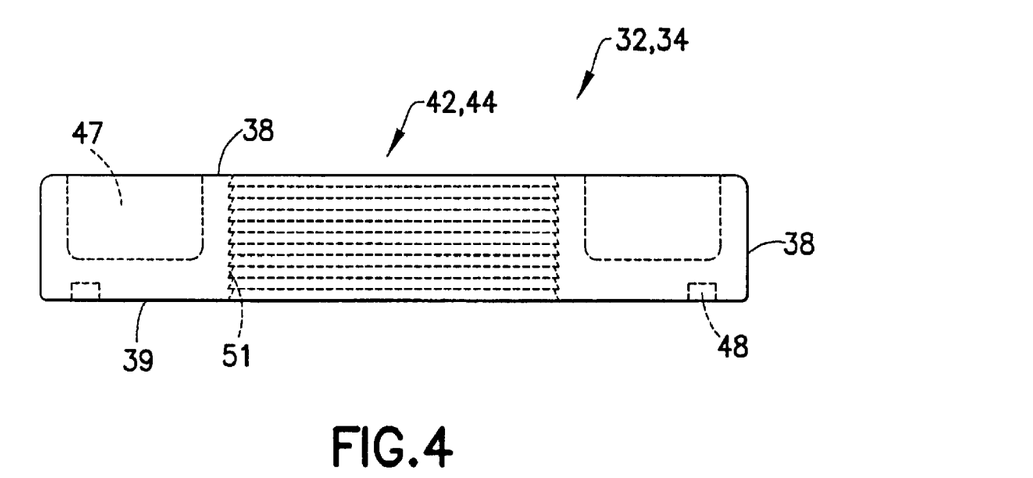
FIGS. 4 and 4A are cross-sectional views of a grommet base member.
Figure 4A:
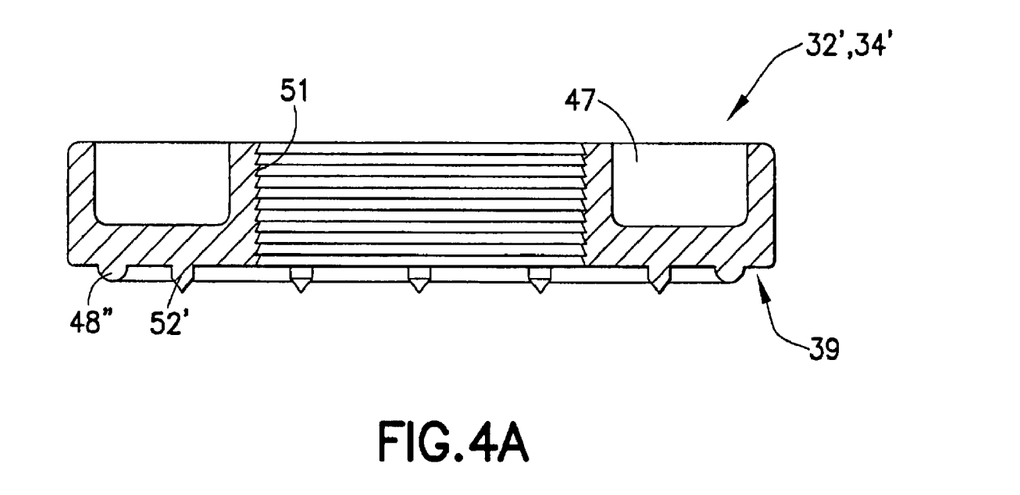

Surfaces 37 of central openings 42, 44 has circles of wedge shaped grooves 51. Each circular wedge shaped grooves 51 has two edges or surfaces. A horizontal surface projects outward at substantially 90 degrees from surface 37 and is perpendicular to the axis of barrel 36. The second surface is an "angled surface" which is attached at one end to the outward projecting end of the horizontal surface to form the apex of a triangle and, at the other end to the wall. The cross-section of wedge shaped grooves 51 is a right triangle formed by the horizontal surface which is attached to the wall and by an inclined surface which is attached to wall 37 at one end and to the horizontal surface at the other end. The wall of openings 42, 44 form the base of the right triangle as shown in FIG. 4.

When installed, the inclined surfaces of wedge shaped grooves 51 in both grommet bases 32, 34 starting at the outer surface are inclined towards outer surface 39. Thus, when barrel 36 is inserted in grommet base 34, wedge shaped projections 54 are engaged by circles of wedges shaped grooves 51 that project radially from surface of member 34.

Grommet bases 32, 34 are conveniently circular, it being understood that other shapes may be used. Grommet bases 32, 34 can be made of a suitable material, such as nylon, polypropylene or any suitable plastic that can be molded and/or machined. Referring to FIG. 4, there is shown a sectional view of grommet bases 32, 34. As noted above, except for the orientation of grommet bases 32, 34 in use, grommet base 34 is identical to grommet base 32. This substantially simplifies manufacture of the components for the grommet assembly.

Figure 5:
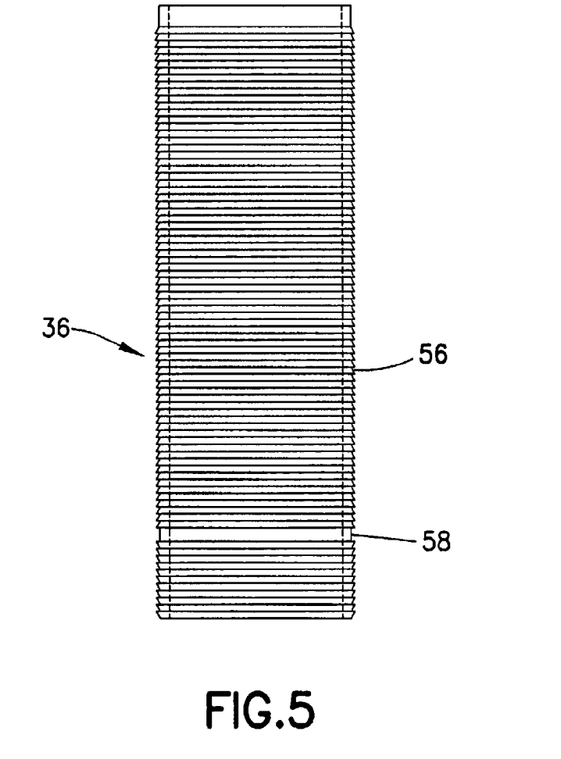
FIG. 5 is a side view of the hollow barrel of FIG. 3.

Hollow barrel 36 has a first end 36a and a second end 36b with an outside diameter sized to fit within openings 42, 44 in grommet base members 32, 34. The surface of barrel 36 has a plurality of circles of wedge shaped projections 54, 56. Wedge shaped members on the surface of barrel 36 are arranged to provide a first short section of a plurality of rows 54 which extend from one end of barrel 36 for a distance substantially equal to the depth of the central opening 44 in grommet base member 34. Thus, when central opening 44 has a length of about 1.0 inch, first rows of wedge shaped projections 54 extend up from the end of barrel 36 for the distance of about 1.0 inch. A second plurality of circles of wedge shaped projections 56 which project radially out from the surface of barrel 36 and are oriented in the opposite direction are formed along the remainder of the surface of barrel 36. There is a short interruption 58 between projections 54 and 56. As with the wedge shaped members located in openings 42, 44 wedge shaped projections 54, 56 on barrel 36 have two surfaces, a horizontal surface which projects radially outward at substantially 90 degrees from the surface of the barrel and an angled surface attached at one end to the outward projecting end of the horizontal surface and at the other end to the wall of barrel 36. Wedge shaped projections 54, 56 formed by the two surfaces is substantially a right triangle and completely encircles barrel 36.

In this embodiment, holes 30 formed in liner 20 have a diameter of about 2.80 inches. Thus, barrel 36 is provided with an outer diameter to the end of wedge shaped projections 54, 56 of 0.001 inch less.

If desired, threaded fasteners 52 can be placed in openings 50 in grommet base 34 and secured to liner 20. Threaded fasteners 52 should not extend completely through liner 20. Lower end 36a of barrel 36 is now passed through liner 20 and pressed into central opening 44 in grommet base 34 until bottom end 36a of barrel 36 is substantially flush with outer surface 33 of grommet base 34. Next, central opening 42 in grommet base 32 is positioned over and aligned with end 36b of barrel 36 and pressed down with sufficient force until inner surface 39 of grommet base 32 contacts liner 20 squeezing it between grommet base 32 and grommet base 34.

As grommet bases 32, 34 compress liner 20, the horizontal surfaces of wedge shaped grooves 51 engage and push against the horizontal surfaces wedge shaped projections 54, 56 on barrel 36. Wedge shaped grooves 51 on bottom member 34 and wedge projections 54 on barrel 36 are configured to both allow barrel 36 to be pushed into central opening 44 in grommet base 34 and prevent barrel 36 from being pulled out. In like manner, wedge shaped grooves 51 on grommet base 32 and barrel 36 allow top member 32 to be pushed down along barrel 36 to squeeze liner 20 between grommet base 32, 34 yet strongly resist member 32 from moving back up along barrel 36.

Referring now to FIG. 7, a partial sectional view of barrel 36 located in aperture 30 of liner 20 and being securely held between grommet base 32 and grommet base 34 with wedge shaped projections 54, 56 on barrel 36 engaging grooves 51 on grommet bases 32, 34. During assembly, as bottom 36a of barrel 36 is being pushed into the central opening 44 of grommet base 34, the angled surfaces of wedge shaped projections 54 contact and yield slightly and slide over the angled surfaces on grommet base 34 which may also yield slightly until barrel 36 is fully inserted into bottom member 34. At this time, the horizontal surfaces of the wedge shaped projections 54 on barrel 36 engage the horizontal surfaces of grooves 51 on grommet base 34 to prevent barrel 36 from moving back out of grommet base 34. Thus, barrel 36 is held captive to grommet base 34.

As second grommet base 32 is pushed down along barrel 36 past end 36b, the angled surfaces of wedge shaped grooves 51 that project out from the surface of opening 42 in base 32 yield slightly and slide over the angled surfaces of the wedge shaped projections 56 on barrel 36 which also yield slightly until base 32 contacts and squeezes tubular liner 20 against grommet base 34. At this time, the horizontal surfaces of the wedge shaped projections 56 on barrel 36 engage the horizontal surfaces on grooves 51 on grommet base 32 to prevent top member 32 being pushed up along barrel 36. In this embodiment, the angle between the horizontal surface and the angled surface of the right triangle shaped wedges is about 66 degrees. It is understood that this dimension is not critical and that other dimensions which may vary form 10 to 80 degrees may be used. What is important is that grooves 51 have an inclined surface that face complimentary surfaces on grommet bases 32, 34. Liner 20 is then squeezed between grommet bases 32, 34 and further compressed by O-rings 48' in grommet bases 32, 34. After grommet base 32 has been pressed down along barrel 36 and squeezes tubular liner 20 to a desired pressure, any exposed portion of barrel 36 that projects above surface 33 of base 32 is cut off flush with surface 33.

When pushing barrel 36 into grommet base 34 the lower member, a force of from hand pressure to about 2,500 lbs. is required. When pressing grommet base 32 along barrel 36 and squeezing liner 20 to seal it between bases grommet 32, 34, a compression force of about 20,000 lbs. is used.

In the illustrated embodiment top and bottom members 32, 34 and barrel 36 are nylon. However, other engineering plastic such as polyethylene, polypropybene, polyacetal, and the like which can be machined and/or worked and has the necessary physical characteristics can be used in place of nylon.

In another embodiment, top and bottom members 32, 34 and barrel 36 can be of a material other than plastic. For example, brass, iron, steel or the like may be used. When a metal is used instead of plastic, it may be more economical to use members having coarse screw threads rather than wedge shaped members. To minimize the cost of manufacture it is suggested that the cylindrical walls of grommet bases 32, 34 and of barrel 36 be threaded where the threaded size is sufficient to withstand the forces which are required to be applied to liner 20.

In still another embodiment, the hollow barrel can be threaded to receive nuts and the cylindrical openings in the top and bottom members can be smooth. In this embodiment, a threaded nut is placed onto each end of the barrel and screwed down to squeeze the tubular liner between the top and bottom members with the required force.

A length of barrel 36 is about 6 inches and has been found to be sufficient for use with uncompressed felt liners which form tubes having diameters from 12 inches to 98 inches. In those instances where a barrel length of 6 inches is not sufficient, a barrel having a greater length, such as up to about 12 inches can be substituted.

The invention here disclosed is not limited to a liner of a single diameter, but is intended for use with tubular liners of widely varying diameters. Typically, these range from about 6 or 8 inches upwards to 96 inches in diameter. As the size increases, generally the thickness of the felt also increases from 6 mm to about 150 mm. In these cases the number of holes made in the liner and the number of grommet assemblies used will differ depending on the tubular liner diameters. A liner of from 12 to 36 inches in diameter will generally require about two and a liner 96 inches in diameter requires about 6 grommet assemblies.

Figure 6:
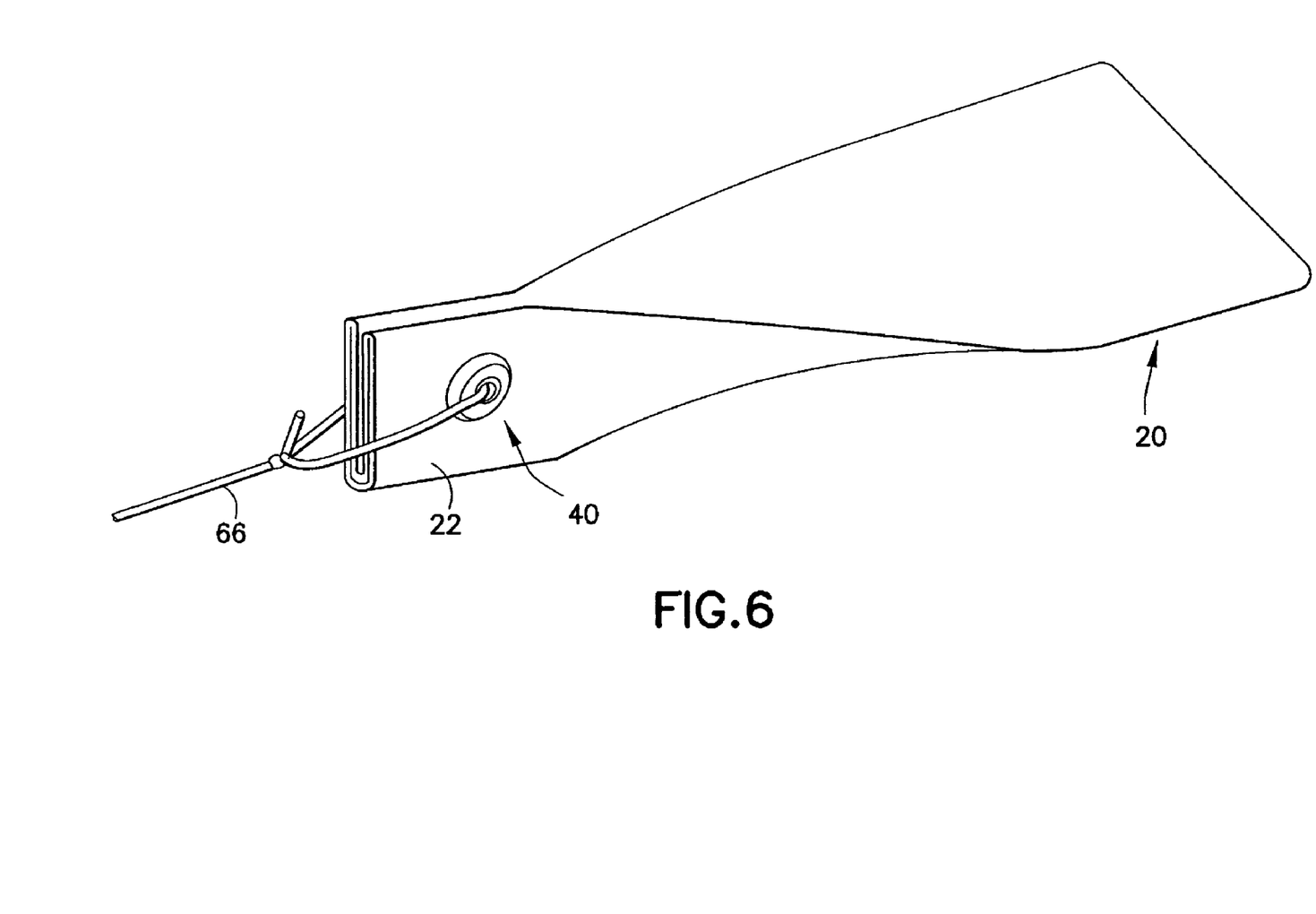
FIG. 6 is a perspective view showing the use of the grommet for securing a holdback cable to an end of the liner.

Liner 20 is then fully impregnated with resin and is then ready to be inserted into a conduit that is to be lined. The liner may optionally be impregnated with resin after transport to the job site. A rope and a lay flat hose are then attached to the end of liner 20 to control the rate of eversion and to transport the lay flat hose to the far end of the pipeline so that hot water or steam can be fed to the end in order to effect hardening of the resin throughout the pipeline. FIG. 6 shows an arrangement wherein a rope 66 is passed through reinforced grommet assembly 40 to at an end 22 of liner 20. This arrangement is satisfactory for a liner with a smaller diameter because the grommet bases 32, 34, tightly clamp liner 20 and can distribute the load on a hold-back rope 66 into the felt layers during eversion and is strong enough to hold end 22 of liner 20 closed when the eversion is completed.

Figure 8:
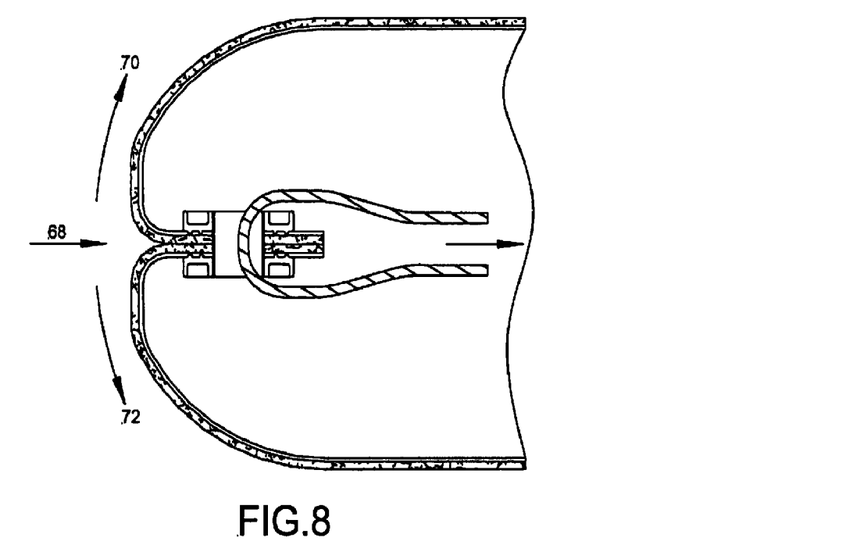
FIG. 8 is a cross-sectional view of the end of a fully everted resin impregnated liner showing the grommet in accordance with the invention.
Figure 9:
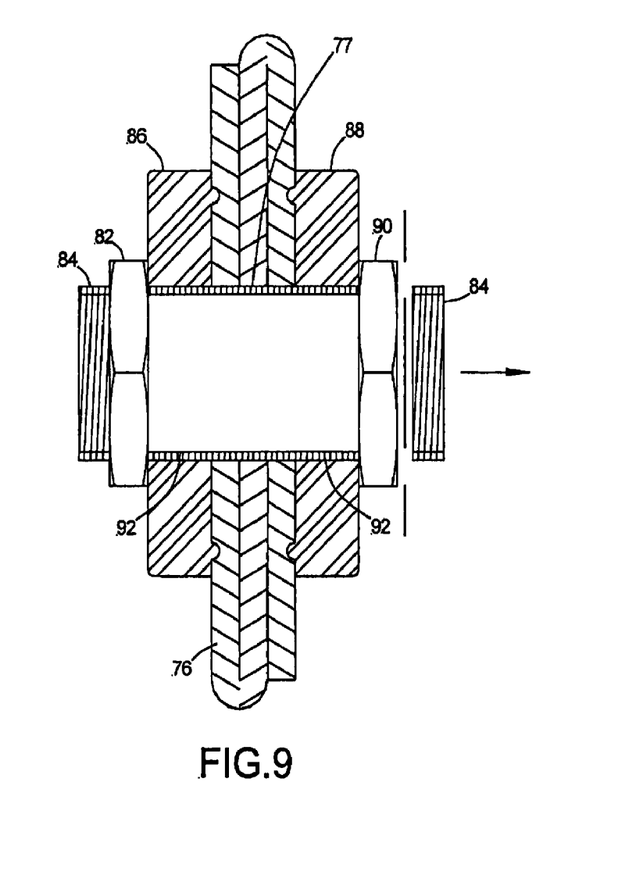
FIG. 9 is a cross-sectional view of another embodiment of the invention.

For a liner of larger diameter, however, the force applied to the apertures in the tubular liner and to the top and bottom members which clamp the tubular liner may be so great as to split the felt at position 68, as shown in FIG. 8. If this should occur, the liner can be triple-folded as shown in FIG. 9. With the invention here disclosed, grommet base members have a diameter that is sufficiently large so that the loads imposed by the felt resisting the water or steam pressure are taken in the plane of grommet base members, as shown by arrows 70 and 72 in FIG. 8.

FIG. 9 also illustrates another embodiment wherein openings 92 in grommet base members 86 have no wedge shaped projection and are sized to freely receive a hollow barrel 84. In all other respects the top and bottom members are as described above. The surface of hollow barrel 84 supports threads which can extend from one end of barrel 84 to the other. In the alternative, threads on barrel 84 can extend part way down from each barrel end, but not along the central part of the barrel. A nut 82 is threaded on to an end of barrel 84 and barrel 84 is inserted into opening in grommet base 86 and then through holes 77 in liner 76. Then second grommet base 88 is placed onto the protruding end of barrel 84 and a second nut 90 is threaded onto the protruding end of barrel 84. Nuts 82, 90 are now tightened to squeeze liner 76, and the barrel ends that protrude beyond nuts 82, 90 are cut off flush with the top surface of the nuts. In this case the threads on the outside of barrel 84 is continuous.

Figure 10:
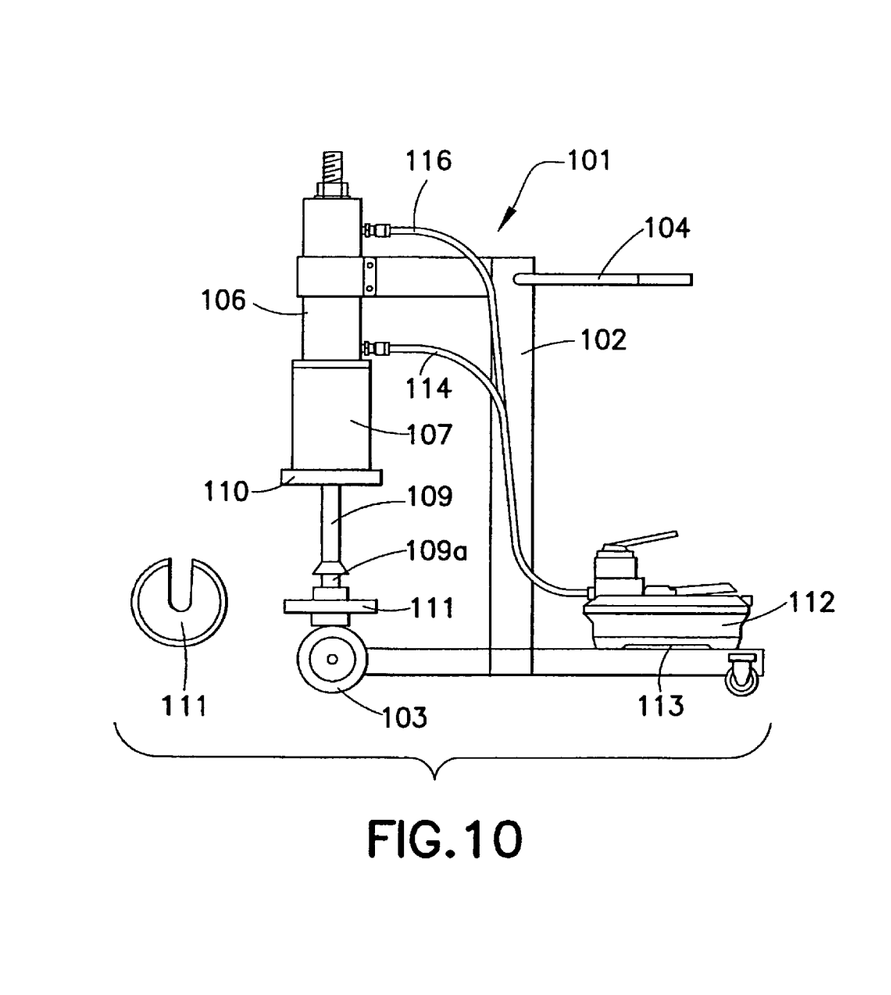
FIG. 10 is a side elevational view in partial section showing a hydraulic grommet press and pressure plate for installing the grommets and barrel of FIG. 3.
Figure 11:
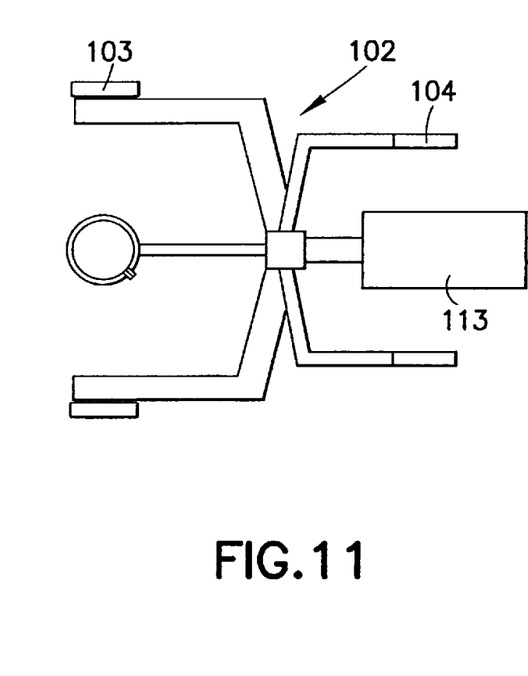
FIG. 11 is top plan view of the grommet press of FIG. 10.

In view of the substantial force required to install grommet assembly 40, a grommet press 101 as illustrated in FIGS. 10 and 11 is utilized for installing holdback grommets 40 on the ends of liner 20. The design uses includes a frame 102 with wheels 103 and handles 104 for easy manipulation into operating position. Grommet press 101 includes an upper hydraulic cylinder 106 with a hydraulic piston and a lower hollow cylindrical cavity 107 with an upper compression plate 110 at the bottom thereof.

A piston rod or center shaft 109 is operatively coupled to hydraulic cylinder 106. An air hydraulic pump 112 is mounted on a mounting platform 113 on frame 102. Air pump 112 is connected to hydraulic cylinder 106 by hydraulic cables 114 and 116. Shaft 109 has notched grooves 109a at the lower end on which a removable lower compression plate 111 is installed. As hydraulic cylinder 106 is powered, it moves up so that upper compression plate 110 and lower compression plate 111 come together providing the necessary force of about 20,000 lbs. required for clamping grommet assembly 40 onto liner 20 and compressing liner 20 to seal it.

The steps required to perform grommet installation include inserting a pre-assembled grommet base 34 and barrel 36 through pre-cut hole 30 in an end of liner 20. A second grommet base 32 is placed on top of liner 20 and directly above lower grommet 34 and barrel 36 are loaded onto center shaft 109. Lower compression plate 111 is inserted onto notched groove 109a in center shaft 109.

Grommet assembly 40 is now ready to be pressed on liner 20 and pressure is applied and hydraulic piston and shaft 109 moves upwards pulling preassembled grommet base 32 and barrel 36 towards hollow cavity 107 with a portion of barrel 36 protruding from top of upper grommet 32 through upper compression plate 110. This pushes grommet base 32 to liner 20 and compresses liner 20 to seal it. After liner is removed from press 101, the portion of barrel 36 protruding through grommet base 32 is cut flush with outer surface 33 of grommet base 32. ¼"×¾" sheet metal screws 52 are then installed to provide additional grip onto coated felt surface of liner 20.

Press 101 may also be used to pre-assemble lower grommet 34 and barrel 36. Here, barrel 36 with the short section of wedges 54 facing piston 106 and grommet base 34 are placed over center shaft 109 with outer surface 39 of grommet 34 against upper compression plate 110 on hollow cavity 107. Compression plate 111 is inserted in groove 109a and barrel 36 is drawn up into grommet base 34 about one inch to complete the pre-assembly.

It will thus be seen that the objects set forth above, among those made apparent from the preceding description, are efficiently attained and, since certain changes may be made in carrying out the above process, in the described product, and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A grommet for reinforcing an opening in a cured in place liner, comprising:
   first and second grommet bases each having an outer surface and an opposed inner liner facing surface with a central opening extending between the two surfaces;
   each grommet opening having a securement surface; and
   a barrel having first and second securement surfaces adapted for engaging the securement surfaces of the grommet bases when the barrel is inserted into the central opening in the grommet bases, the first and second securement surfaces of the barrel being oriented in opposite directions such that engagement of the first securement surface with the securement surface of the first grommet base prevents nonrotational movement of the first grommet base in a first direction and engagement of the second securement surface with the securement surface of the second grommet prevents nonrotational movement of the second grommet base in a second direction which is opposite the first direction.

2. The grommet of claim 1 wherein the barrel has opposite ends and each end is sized and configured for insertion into the central opening of one of the first and second grommet bases.

3. A grommet for reinforcing an opening in a cured in place liner;
   two grommet bases each having an outer surface and an opposed inner liner facing surface with a central opening extending between the two surfaces;
   the opening having a plurality of circles of wedge shaped grooves, each circle of grooves having in cross-section an edge inclined with respect to the axis of the opening and an edge perpendicular to the axis, the inclined edge starting at the outer surface inclined away from the axis of the opening; and
   a barrel having a first series of circular wedge shaped projections for engaging the grooves on one of the grommet bases when inserted into the opening in the grommet base and a second series of wedge shaped projections for engaging the grooves on the other grommet base when inserted into the opening in the grommet base, wherein the first series of circular wedge shaped projections has an opposite orientation with respect to the second series of circular wedge shaped projections so the first and second series of circular wedge shaped projections prevent movement of the grommet base members in opposite directions when the opening of one of the grommet bases is received on the barrel over the first series of circular wedge shaped projections and the opening of the other of the grommet bases is received on the barrel over the second series of circular wedge shaped projections.

4. The grommet of claim 3, wherein the projections at one end of the barrel extend a distance about the length of the opening in the grommet base.

5. The grommet of claim 3, wherein the inclined edge of the wedge shaped grooves and projections are inclined with respect to the axis of the opening in the grommet base between 10 to 80 degrees.

6. The grommet of claim 3, wherein the inclined edge of the wedge shaped grooves and projections are inclined to the axis of the opening in the grommet base between about 40 to 70 degrees.

7. The grommet of claim 3, where at least the barrel is a substantially rigid polymeric material.

8. The grommet of claim 7, wherein any excess length of the barrel extending beyond the grommet bases is cut at the outer surface of the grommet bases.

9. The grommet of claim 3, wherein the inner liner facing surface of at least one of the grommet bases has a circular groove for receiving an O-ring.

10. The grommet of claim 3, wherein the inner facing surface of at least one of the grommet bases has an integrally formed O-ring.

11. The grommet of claim 3, including holes formed in the outer surface of the grommet bases for securing a fastener to the liner.

12. The grommet of claim 3, wherein each grommet base is substantially tubular with the opening at the center thereof.

13. A grommet for reinforcing an opening in a cured in place liner, the grommet comprising:
   first and second grommet bases each having an outer surface and an opposed inner liner facing surface with a central opening extending between the two surfaces;
   a barrel having opposite first and second ends each sized and configured for insertion into the central opening of a respective one of the first and second grommet bases; and
   a securement surface on at least one of the barrel and the central openings of the first and second grommet bases, the securement surface being configured for preventing the first and second grommet bases from moving in opposite directions when the central openings of the first and second grommet bases are received on the barrel.

14. The grommet of claim 13 wherein the securement surface is on the barrel.

15. The grommet of claim 14 wherein the securement surface is on the barrel and the openings of the first and second grommet bases.

16. A grommet for reinforcing an opening in a cured in place liner, the grommet comprising:
   two grommet bases each having an outer surface and an opposed inner liner facing surface, the inner liner facing surfaces each having a circular groove for receiving an O-ring;
   at least one of the grommet bases including a central opening extending between the outer surface and the inner liner facing surface, the opening having a securement surface;
   a barrel having a complimentary securement surface adapted for engaging the securement surface of the grommet base when the barrel is inserted into the opening in the grommet base, the securement surfaces being configured such that when the opening of the grommet base is received on the securement surface of the barrel the securement surface of the barrel permits the grommet base to move in a first direction toward the other grommet base and prevents the grommet base from moving in a second direction away from the grommet base, the second direction being opposite the first direction.

17. The grommet of claim 16 wherein each grommet base includes the central opening having the securement surface.

18. The grommet of claim 16 further comprising first and second O-rings adapted for reception in the circular grooves of the grommet bases.

19. A grommet for reinforcing an opening in a cured in place liner, the grommet comprising:
   two grommet bases each having an outer surface and an opposed inner liner facing surface, the inner liner facing surfaces each having an integrally formed O-ring;
   at least one of the grommet bases including a central opening extending between the outer surface and the inner liner facing surface, the opening having a securement surface;
   a barrel having a complimentary securement surface adapted for engaging the securement surface of the grommet base when the barrel is inserted into the opening in the grommet base, the securement surfaces being configured such that when the opening of the grommet base is received on the securement surface of the barrel the securement surface of the barrel permits the grommet base to move in a first direction toward the other grommet base and prevents the grommet base from moving in a second direction away from the grommet base, the second direction being opposite the first direction.

20. The grommet base of claim 19 wherein each grommet base includes the central opening having the securement surface.

* * * * *